(12) United States Patent
Becher

(10) Patent No.: US 10,329,096 B2
(45) Date of Patent: Jun. 25, 2019

(54) METHOD FOR HANDLING SORTING ITEMS WITH MONITORED TELESCOPIC BELT CONVEYORS

(71) Applicant: SIEMENS AKTIENGESELLSCHAFT, Munich (DE)

(72) Inventor: Joern Becher, Mainz (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/059,282

(22) Filed: Aug. 9, 2018

(65) Prior Publication Data

US 2019/0047792 A1 Feb. 14, 2019

(30) Foreign Application Priority Data

Aug. 9, 2017 (EP) ..................................... 17185625

(51) Int. Cl.
*B65G 21/14* (2006.01)
*B07C 5/02* (2006.01)
*B65G 47/18* (2006.01)

(52) U.S. Cl.
CPC ............... *B65G 21/14* (2013.01); *B07C 5/02* (2013.01); *B65G 47/18* (2013.01)

(58) Field of Classification Search
CPC ............ B65G 21/14; B65G 67/08; B60P 1/36
USPC ........ 198/812, 617; 414/298, 398, 393, 390, 414/507, 528; 37/305
See application file for complete search history.

(56) References Cited

U.S. PATENT DOCUMENTS

| | | | | |
|---|---|---|---|---|
| 3,596,785 A | * | 8/1971 | Weatherford, Jr. .... | B65G 21/14 198/313 |
| 3,779,404 A | * | 12/1973 | McWilliams .......... | B65G 67/08 198/579 |
| 3,780,843 A | * | 12/1973 | McGovern, Jr. ....... | B65G 13/12 193/35 TE |
| 3,819,068 A | * | 6/1974 | Weir .................... | B65G 59/023 193/2 R |
| 3,853,230 A | * | 12/1974 | Schultz .................... | B60P 1/52 414/392 |
| 3,885,682 A | * | 5/1975 | McWilliams .......... | B65G 67/08 198/577 |

(Continued)

FOREIGN PATENT DOCUMENTS

WO  2015000752 A1  1/2015

*Primary Examiner* — Joseph A Dillon, Jr.
(74) *Attorney, Agent, or Firm* — Laurence Greenberg; Werner Stemer; Ralph Locher

(57) ABSTRACT

Sorting items are loaded into, or unloaded from, a transport volume. A transport volume-side end of a telescopic conveyor is telescoped into the transport volume to reach a suitable loading position. Then the sorting items are transported into the transport volume or unloaded and transported out of the transport volume. The position of the volume-side end of the conveyor is adjusted as a function of the ongoing loading or unloading state. The adjusted position is acquired by way of a control unit. The expected residual loading or unloading time remaining for the transport volume is determined on the basis of the acquired adjusted position and, optionally, the time profile of the process. The adjusted position may be determined from a rotational speed and/or an activation duration of the drive motor that adjusts the telescopic conveyor.

4 Claims, 4 Drawing Sheets

(56) References Cited

U.S. PATENT DOCUMENTS

| | | | | |
|---|---|---|---|---|
| 4,946,027 A * | 8/1990 | Jenkins | ............. | B65G 21/12 182/2.11 |
| 5,000,646 A * | 3/1991 | Pietropaoli | ............. | B64D 9/00 244/137.1 |
| 5,088,873 A * | 2/1992 | Ruder | ............. | B65G 67/08 414/392 |
| 5,325,953 A * | 7/1994 | Doster | ............. | B65G 43/08 198/304 |
| 5,685,416 A | 11/1997 | Bonnet | | |
| 5,697,753 A * | 12/1997 | Aurora | ............. | B65G 67/08 414/398 |
| 5,718,325 A * | 2/1998 | Doster | ............. | B65G 43/08 193/35 TE |
| 5,796,052 A * | 8/1998 | Christmann | ............. | G01G 11/00 177/119 |
| 5,831,540 A | 11/1998 | Sullivan et al. | | |
| 5,902,089 A * | 5/1999 | Sinn | ............. | A01K 45/005 198/313 |
| 6,360,876 B1 * | 3/2002 | Nohl | ............. | B65G 41/008 198/302 |
| 7,074,001 B2 * | 7/2006 | Kinzer | ............. | B65D 88/022 198/588 |
| 7,370,753 B2 * | 5/2008 | Yang | ............. | B65G 21/14 193/35 TE |
| 2001/0009217 A1 * | 7/2001 | Gilmore | ............. | B65G 21/14 198/812 |
| 2002/0015635 A1 * | 2/2002 | Sinn | ............. | A01K 45/005 414/346 |
| 2002/0153229 A1 * | 10/2002 | Gilmore | ............. | B65G 21/14 198/568 |
| 2002/0187022 A1 * | 12/2002 | Horak | ............. | B65G 21/08 414/140.2 |
| 2003/0049107 A1 * | 3/2003 | Thogersen | ............. | B64F 1/32 414/398 |
| 2004/0262120 A1 * | 12/2004 | LeCroy | ............. | B65G 19/28 193/30 |
| 2007/0012548 A1 * | 1/2007 | Yang | ............. | B65G 21/14 198/812 |
| 2007/0140821 A1 * | 6/2007 | Garon | ............. | B25J 9/0084 414/618 |
| 2009/0169349 A1 * | 7/2009 | Reed | ............. | B65G 67/08 414/507 |
| 2012/0160636 A1 * | 6/2012 | Windfeld | ............. | B65G 41/005 198/592 |
| 2012/0207572 A1 * | 8/2012 | Enenkel | ............. | B65G 67/08 414/502 |
| 2014/0166553 A1 * | 6/2014 | Enenkel | ............. | B65B 67/08 209/645 |
| 2014/0205403 A1 * | 7/2014 | Criswell | ............. | B25J 5/007 414/395 |
| 2014/0348625 A1 * | 11/2014 | Heitplatz | ............. | B65G 67/08 414/795.4 |
| 2015/0314972 A1 * | 11/2015 | Schenning | ............. | B65G 47/914 414/752.1 |
| 2015/0352721 A1 | 12/2015 | Wicks et al. | | |
| 2016/0016204 A1 * | 1/2016 | Schwarzbauer | ............. | B65G 67/08 209/552 |
| 2016/0264366 A1 * | 9/2016 | Heitplatz | ............. | B65G 21/14 |
| 2017/0073175 A1 | 3/2017 | Wicks et al. | | |
| 2017/0096301 A1 * | 4/2017 | Hartmann | ............. | B65G 21/10 |
| 2017/0297832 A1 * | 10/2017 | Criswell | ............. | B65G 67/08 |
| 2018/0118476 A1 * | 5/2018 | Bastian, II | ............. | B65G 67/08 |
| 2018/0134501 A1 * | 5/2018 | Ge | ............. | B65G 15/00 |
| 2018/0148279 A1 * | 5/2018 | Criswell | ............. | B25J 5/007 |

* cited by examiner

METHOD FOR HANDLING SORTING ITEMS WITH MONITORED TELESCOPIC BELT CONVEYORS

CROSS-REFERENCE TO RELATED APPLICATION

This application claims the priority, under 35 U.S.C. § 119, of European patent application EP 17 185 625.5, filed Aug. 9, 2017; the prior application is herewith incorporated by reference in its entirety.

BACKGROUND OF THE INVENTION

Field of the Invention

The invention relates to a method for loading sorting items into a transport volume, or for unloading sorting items from the transport volume.

In courier, parcel and express logistics service providers, large quantities of parcels and packages (generally referred to as items or goods to be sorted) generally have to be unloaded from transport volumes, such as truck trailers, railway containers and airport dollies, sorted and loaded back into the transport volumes according to the sorting carried out. In this context, the unloading and loading procedure takes place in most cases on so-called telescopic belt conveyors (telescopic belts, telescopic conveyors), on which the transport volumes are provided at large entrance doors of the sorting centers and manually placed on conveyor belts (unloading) or removed therefrom by conveyor belts and stacked into the transport volumes (loading). It is plausible that, as a result of the size, particularly the length, of the transport volume, personnel have to travel great distances in particular if the transport volumes are being emptied incrementally or loaded initially.

In order to shorten these distances, during unloading and loading the conveyor belts possess a region with a telescope-like design, which can be moved into the transport volumes or moved out from them once again. The employee situated at the transport volume-side end of said telescopic region can, at all times, place himself in a loading and/or unloading position which is optimal for him in relation to the fill level of the transport volume. In any case, a conveyor belt appropriated for the telescopic region conveys the sorting items up to said transport volume-side end of the telescopic region, or away therefrom, so that the employee is always able to place the sorting items on the conveyor belt in the immediate vicinity of his location, or remove them therefrom.

In order to achieve a smooth operating sequence, it is particularly advantageous if the most optimal use can be made of the available employees according to their availability as a function of the sorting items which are to be unloaded and/or loaded. To this end, emptied transport volumes in the unloading region must be exchanged with full transport volumes as quickly as possible by the yard logistics team. In the loading region, full transport volumes must be exchanged with empty ones as quickly as possible.

It is unfortunately often the case nowadays in such logistics centers that the yard logistics team is temporarily overloaded by these exchanges and the floor personnel are not working to capacity as a result. It is also often the case that terminals fill up and sorting items recirculate at the sorting facility due to overloaded terminals, which has negative repercussions on sorting procedures already in progress. This can also result in sorting items entering the overflow after the xth recirculation and then having to be processed manually. All of the cases given above lead to a reduction in the productivity and the throughput.

Due to the fact that it is not currently possible to predict or control the requirements of the yard logistics team due to full or empty transport volumes at present, recirculation rates of over 30% can often be observed in logistics centers at peak times, which represents an equally large drop in productivity.

In order to avoid these productivity losses, even camera systems or ultrasound systems have already been used which can measure the fill level of the transport volumes. These solutions, however, require comparatively high one-off investment costs and also involve costs for maintenance and materials management. For this reason, such systems have also been unable to become widely used in the market to date.

SUMMARY OF THE INVENTION

It is accordingly an object of the invention to provide a method of handling items which overcomes the above-mentioned and other disadvantages of the heretofore-known devices and methods of this general type and to provide a method for loading sorting items into a transport volume or for unloading sorting items from the transport volume, in which the requirement for personnel and yard traffic can be optimally controlled according to the available resources and according to the arising sorting and distribution requirements.

With the foregoing and other objects in view there is provided, in accordance with the invention, a method for loading sorting items into a transport volume or for unloading sorting items from the transport volume.

The method comprises the following steps for an unloading procedure of the transport volume:
positioning a transport volume-side end of a telescopic conveyor relative to the transport volume in order to reach a suitable unloading position;
unloading the sorting items at the transport volume-side end of the telescopic conveyor;
discharging the sorting items on the telescopic conveyor up to the end thereof opposite the transport volume;
extending the transport volume-side end into the transport volume as a function of the ongoing unloading state in order to adapt the unloading position;
acquiring the adjusted position by way of a control unit; and
determining the expected residual unloading time remaining for the transport volume on the basis of the acquired adjusted position and, optionally, the time profile thereof.

The method comprises the following steps for a loading procedure of the transport volume:
telescopically adjusting a transport volume-side end of a telescopic conveyor into the transport volume in order to reach a suitable loading position;
introducing the sorting items on the telescopic conveyor up to the transport volume-side end thereof;
unloading the introduced sorting items into the transport volume;
adapting the adjustment of the transport volume-side end of the telescopic conveyor as a function of the ongoing loading state in order to adapt the loading position;
acquiring the adjusted position by way of a control unit; and determining the expected residual loading time remaining for the transport volume on the basis of the acquired adjusted position and, optionally, the time profile thereof.

The term "sorting items" must be understood contextually. Typically, those goods that are unloaded from the transport volume will be "items to be sorted" when they are being delivered in bulk to the sorting facility. Those goods that are being loaded into the transport volume will be "sorted items" when they arrive from having been sorted at the sorting facility.

On the basis of the invention, it is possible to acquire the current adjusted position and, optionally, the time profile of the telescopic action and to incorporate the controlling of personnel requirements and the operating sequence. In this manner, bottlenecks/idle times in terms of personnel and changing the transport volume can be avoided and thus the operating sequence can be made more consistent. Thus, for example, it is possible to intervene directly in the packing performance during loading and/or the removal performance during unloading and breaks can be partially brought forward or pushed back. Additional shunting staff and/or truck drivers can also be called on for storing and withdrawing tasks for the transport volume.

The aforementioned method can be carried out with particularly low investment costs, if the adjusted position is determined by the rotational speed and/or the activation duration of a drive motor for telescopic adjustment of the transport volume-side end of the telescopic conveyor being acquired. In this way, there is no need to mount and maintain sensors for acquiring the position of the telescopic region of the telescopic conveyor. In principle, it is also possible in this manner for certain adjusted positions to be predefined which, when reached, trigger direct notifications to the process controller, such as e.g. an estimate of 15 minutes remaining until the transport container is completely loaded/unloaded or similar, with which the process controller then initiates targeted follow-up measures, such as providing a truck driver for dispatching the transport volume or providing sorting items for (further) loading of the upcoming unloaded transport volume.

In addition or even alternatively, at least one sensor can also be arranged which detects when at least one predetermined adjusted position is reached during the loading and/or unloading procedure.

It can be particularly advantageous for the operating sequence if, in an advantageous embodiment of the invention, the method makes provision for prompting measures for discharging the transport volume as a response to the identified remaining loading time and/or prompting measures for discharging the transport volume or for refilling the transport volume as a response to the identified remaining loading time.

Other features which are considered as characteristic for the invention are set forth in the appended claims.

Although the invention is illustrated and described herein as embodied in a method for handling sorting items with monitored telescopic belt conveyors, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
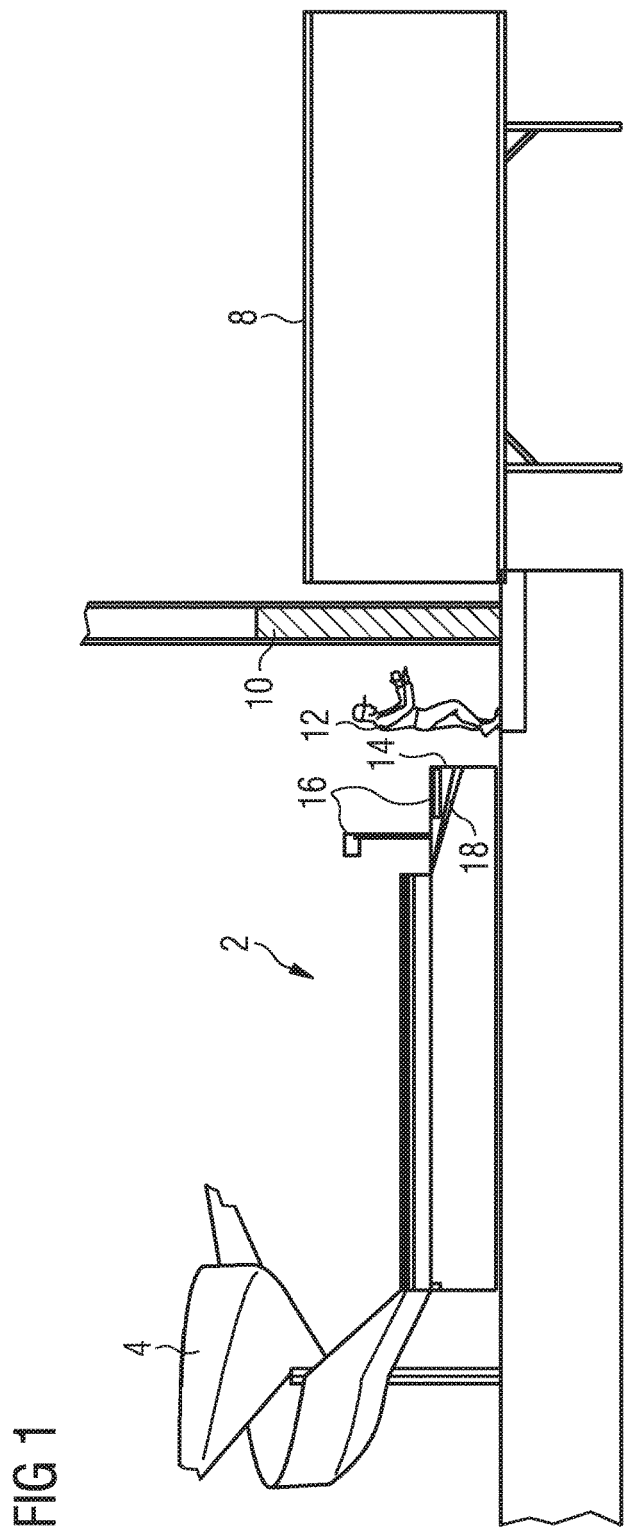
FIG. 1 shows a schematic representation of a side view of a telescopic conveyor at the beginning of a loading procedure for a truck trailer (subsequently referred to as trailer for short)

Referring now to the figures of the drawing in detail and first, particularly, to FIG. 1 thereof, there is shown a schematic side view of a telescopic conveyor 2 in a logistics and sorting center for goods to be sorted, such as parcels, packages, mail correspondence, and the like. In the diagram in the drawing, a chute 4 is provided to the left of the telescopic conveyor 2, with which goods (i.e., items) to be sorted 6 can be guided onto the telescopic conveyor 2. In the diagram in the drawing, a trailer 8, which is currently empty and separated from an employee 12 of the center by a loading door 10, is situated to the right of the telescopic conveyor 2. The telescopic conveyor 2 has an operating unit 16 at its trailer-side end 14, which has a control unit for a mobile telescopic extension 18 of the telescopic conveyor 2.

Figure 2:
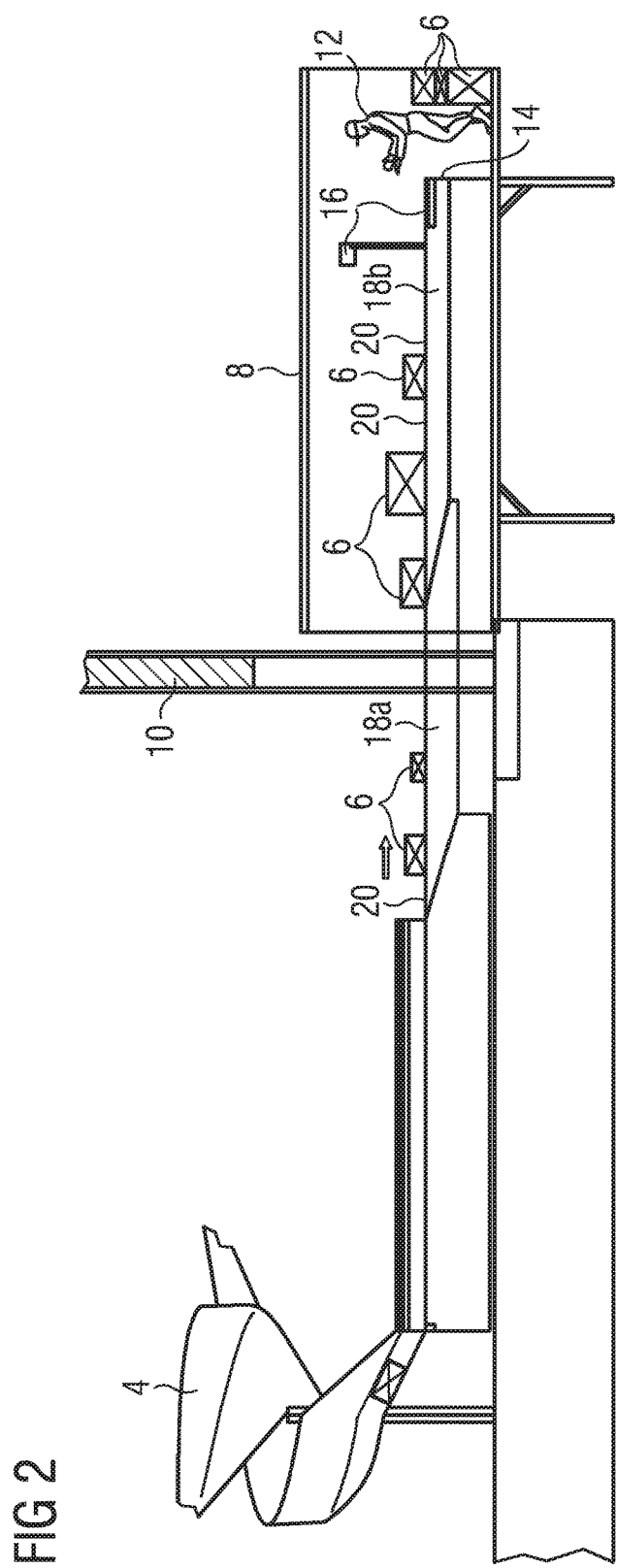
FIG. 2 shows a schematic representation of the side view from FIG. 1 with an extended telescopic conveyor immediately after the beginning of the loading procedure.

In order to load the trailer 8, the employee 12 opens the loading door 10 and moves the telescopic extension 18 into the rear part of the trailer 8, in order to load the sorting items 6 introduced via a conveyor belt 20 of the telescopic conveyor 2 into the trailer 8 there from an optimal loading position. This situation is shown schematically in the side view in accordance with FIG. 2. When extending the telescopic extension 18, which comprises two telescopic sections 18a, 18b, the control unit acquires the rotational speed of the electric motor for extending and retracting the telescopic extension 18. In addition, the time of the motor activation is measured, so that from these two measured variables the current position of the trailer-side end 14 of the telescopic extension 18 can be determined.

Figure 3:
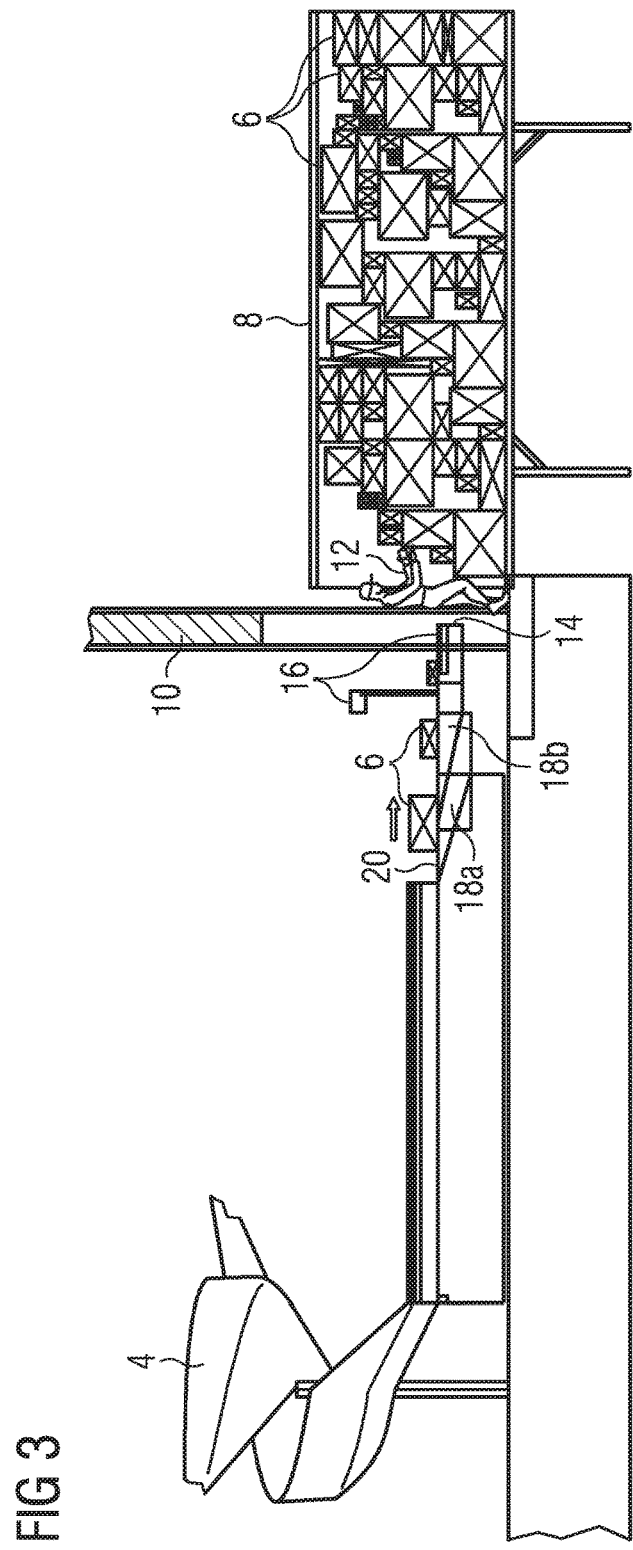
FIG. 3 shows a schematic representation of the side view from FIG. 1 with a telescopic conveyor largely retracted again shortly before the completion of the loading procedure.

As the loading of the trailer 8 continues, the employee moves the telescopic extension 18 farther and farther in, in order for the desired loading position to be situated neither too close to, nor too far away from the current stacking location. Shortly before the complete loading of the trailer 8, the telescopic extension 18 is situated in a state in which it is almost entirely retracted once again, as is shown in a schematic side view in FIG. 3. As early as at a certain position of the telescopic extension 18 before this point (e.g. half a meter before or a meter before or even two meters before), for example, the control unit already acquires this position as a predefined position at which a signal for the further handling of the loading procedure is now triggered. This signal may, for example, have the content that at the current loading pace, which can be determined on the basis of the time profile of the change in position of the telescopic extension 18, it is expected that it will take 15 minutes/30 minutes before the trailer 8 is completely filled. The operator of the center thus obtains the information that the trailer 8 will soon need to be exchanged due to its receiving volume being exhausted in good time. Thus, an empty replacement trailer and a driver can be organized with a sufficient lead time and can then be made available at the right time.

Figure 4:
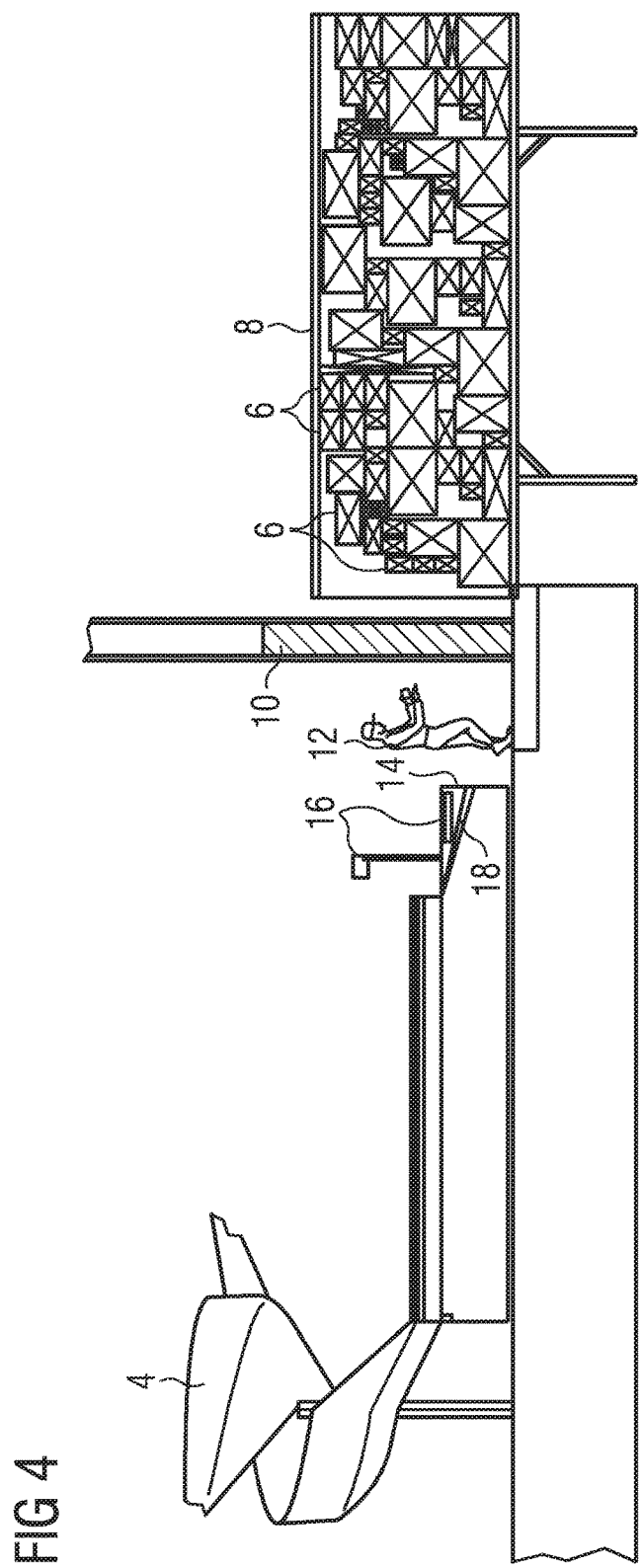
FIG. 4 shows a schematic representation of the side view from FIG. 1 with a telescopic conveyor completely retracted again at the end of the loading procedure.

This state of the trailer 8 considered to be completely full is shown schematically in the side view of FIG. 4. The trailer 8 is full and closed, as is the loading door 10. The telescopic extension 18 is now situated in the completely retracted state once more, as has been shown in FIG. 1 for the beginning of the loading procedure.

In the present exemplary embodiment, the degree of extension is constantly acquired, as described further above. Both the respective start and end points of the telescopic extension 18 are stored in the control unit as a specific loading and a specific unloading position for the telescopic extension 18 in each case. In the former case, the control unit knows that a loading is completed or an unloading is beginning at this time, or a loading is beginning and an unloading is completed, respectively. In the latter case, a signal is triggered which invites the operator of the center to take corresponding follow-up actions, such as e.g. replacing the trailer, providing a driver or the like. In addition, a prediction value can be determined via the extension/retraction speed over a predefined time period, such as 1 minute, 3 minutes, 5 minutes, 10 minutes or 15 minutes for example, indicating when the trailer will be completely full or completely empty. In this manner, it is now possible to make a comparatively precise prediction as to when, how many and which transport tasks will arise for the trailer 8 and the replacement trailer thereof.

The afore-described method is an example of a loading procedure. An unloading procedure would run in precisely the reverse manner, wherein the employee 12 removes the sorting items 6 from the trailer 8 and places them on the trailer-side end 14 of the telescopic extension 18. The conveyor belt 20 then conveys the sorting items 6 into the center, wherein the chute 4 is then exchanged for a further processing apparatus, such as an intermediate storage and/or a feed point for a package sorting facility. This can also take place by pivoting the telescopic conveyor or at specific end loading points, which instead of a package feed, e.g. a package chute, have further processing apparatuses of this kind at the outset, which in fact is also the typical actual state in centers of this kind. As unloading continues, the employee 12 extends the telescopic extension 18 further and further into the transport volume 8, in order to constantly be able to assume an unloading position which is ergonomically sensible. Here too, the position of the telescopic extension 18 can be acquired and used for predicting when the trailer 8 is expected to be unloaded. This results in it being possible for the operator to organize the dispatch of the empty trailer 8 or the reloading thereof (if desired as part of the operating sequence) accordingly in good time.

The invention claimed is:

1. A method for loading sorting items into a transport volume or for unloading sorting items from the transport volume, the method comprising:
    providing a telescopic conveyor with a drive motor for telescopic adjustment of a transport volume-side end of the conveyor;
    selectively performing a loading procedure for loading the transport volume or an unloading procedure for unloading the transport volume;
    in the loading procedure for loading the transport volume:
    a) telescopically adjusting the transport volume-side end of the telescopic conveyor into the transport volume in order to reach a suitable loading position;
    b) transporting the sorting items on the telescopic conveyor up to the transport volume-side end thereof;
    c) unloading the sorting items from the transport volume-side end of the conveyor into the transport volume;
    d) adapting an adjustment of the transport volume-side end of the telescopic conveyor in dependence on an ongoing loading state in order to adapt the loading position;
    e) determining the adjusted position by way of a control unit by acquiring a rotational speed and/or an activation duration of the drive motor for the telescopic adjustment of the transport volume-side end of the telescopic conveyor; and
    f) determining an expected residual loading time remaining for the transport volume based on the adjusted position thus acquired;
    in the unloading procedure for unloading the transport volume:
    a) positioning the transport volume-side end of the telescopic conveyor relative to the transport volume in order to reach a suitable unloading position;
    b) unloading the sorting items onto the transport volume-side end of the telescopic conveyor;
    c) transporting and discharging the sorting items from the telescopic conveyor at an end thereof opposite the transport volume;
    d) telescopically adjusting a position of the transport volume-side end of the telescopic conveyor in dependence on the ongoing unloading state in order to adapt the unloading position;
    e) determining the adjusted position by way of the control unit by acquiring the rotational speed and/or the activation duration of the drive motor for the telescopic adjustment of the transport volume-side end of the telescopic conveyor; and
    f) determining an expected residual unloading time remaining for unloading the transport volume based on the acquired adjusted position.

2. The method according to claim 1, which comprises determining whether at least one predetermined adjusted position has been reached during the loading and/or unloading procedure by way of sensors arranged for that purpose.

3. The method according to claim 1, which comprises discharging the transport volume in response to an identified remaining loading time and/or discharging the transport volume or reloading the transport volume in response to the identified remaining loading time.

4. The method according to claim 1, which comprises:
    in the loading procedure for loading the transport volume, determining the expected residual loading time remaining for the transport volume based on the adjusted position thus acquired and a time profile thereof; and
    in the unloading procedure for unloading the transport volume, determining the expected residual unloading time remaining for unloading the transport volume based on the acquired adjusted position and a time profile thereof.

* * * * *